US000001520H

United States Statutory Invention Registration [19]

[11] Reg. Number: H1520

Hannula

[45] Published: Mar. 5, 1996

[54] FUEL LINE SQUEEGEE

[75] Inventor: Anthony E. Hannula, Fort Walton Beach, Fla.

[73] Assignee: The United States of America as represented by the Secretary of the Air Force, Washington, D.C.

[21] Appl. No.: 451,657

[22] Filed: Dec. 18, 1989

[51] Int. Cl.[6] ..... B30B 3/04; B05C 1/08

[52] U.S. Cl. ..... 100/171; 100/176; 492/13

[58] Field of Search ..... 100/171, 176; 29/110.5; 15/230.11; 156/579; 492/13

[56] References Cited

U.S. PATENT DOCUMENTS

| | | | |
|---|---|---|---|
| 2,231,132 | 2/1941 | Lovett | 156/579 X |
| 2,669,948 | 2/1954 | Naylor | 100/171 X |
| 2,703,423 | 3/1955 | Hunt | 100/171 X |
| 3,340,131 | 9/1967 | Leibow | 100/176 |
| 3,402,656 | 9/1968 | Stocking | 100/176 X |
| 3,403,286 | 3/1969 | Bowes | 29/110.5 |
| 3,450,140 | 6/1969 | Vail | 15/230.11 X |
| 3,601,038 | 8/1971 | Hayes | 100/171 X |
| 3,611,528 | 10/1971 | Lance | 29/110.5 |
| 3,866,532 | 2/1975 | Ogden, Jr. | 100/171 |
| 3,939,862 | 2/1976 | Booth | 137/355.16 |
| 4,032,091 | 6/1977 | Reddy | 244/135 R |
| 4,099,484 | 7/1978 | Ohno | 100/176 X |
| 4,452,135 | 6/1984 | Hayes | 100/153 |
| 4,543,982 | 10/1985 | Wolfe | 137/355.2 |
| 4,617,073 | 10/1986 | Scott | 29/110.5 X |
| 4,644,604 | 2/1987 | Kierce | 15/230.11 X |

*Primary Examiner*—Charles T. Jordan
*Assistant Examiner*—Theresa M. Wesson
*Attorney, Agent, or Firm*—Bobby D. Scearce; Donald J. Singer

[57] ABSTRACT

A device for forcing fluid along a collapsible conduit is described which comprises a yoke including a web and first and second projecting leg members, a first roller supported between the first and second leg members for rotation about a first axis, a block member supporting an axle and a second roller for rotation about a second axis substantially parallel to the first axis, the second leg member and block member each having one or more holes therethrough for receiving bolts connecting the block and second leg member, a spring interconnecting each bolt and the second leg member for resiliently holding the block member and second roller in a substantially parallel juxtaposed position near the second leg member and the first roller, overcenter locking means interconnecting the second leg member and block member for selectively locking the block and second roller into resilient engagement with the second leg member and first roller with a collapsible conduit disposed between the first and second rollers, and a handle connected to the yoke.

2 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

FUEL LINE SQUEEGEE

RIGHTS OF THE GOVERNMENT

The invention described herein may be manufactured and used by or for the Government of the United States for all governmental purposes without the payment of any royalty.

BACKGROUND OF THE INVENTION

The present invention relates generally to a device for forcing fluid along a flexible conduit, and particularly for forcing fuel along a flexible collapsible fuel line toward the fuel source in order to drain the line.

In the performance of refueling operations for aircraft or other vehicles at special operations bases, hot refueling of the vehicles may require that excess fuel contained in the fueling line be forced back along the line to the refueling vehicle or other source. Furthermore, in normal refueling operations substantial fuel savings may be realized by ensuring that excess fuel in the fueling line is returned along the line to the source instead of being spilled or discarded.

The invention provides a device for forcing fluid along a flexible collapsible conduit, such as a fuel supply line, which includes a pair of rollers resiliently held by an overcenter locking means around and against the collapsible conduit and which may be pulled along the conduit to force fluid along the conduit in the direction along which the device is pulled. The device may therefore be used to force excess fuel in a collapsible fuel line back into a refueling vehicle or other fuel source.

It is therefore a principal object of the invention to provide a device for forcing fluid along a flexible conduit.

It is a further object of the invention to provide a device for forcing fuel along a collapsible fuel line in order to drain the line.

These and other objects of the invention will become apparent as the detailed description of representative embodiments proceeds.

SUMMARY OF THE INVENTION

In accordance with the foregoing principles and objects of the invention, a device for forcing fluid along a flexible collapsible conduit is described which comprises a yoke including a web and first and second projecting leg members, a first roller supported between the first and second leg members for rotation about a first axis, a block member supporting an axle and a second roller for rotation about a second axis substantially parallel to the first axis, the second leg member and block member each having one or more holes therethrough for receiving bolts connecting the block and second leg member, a spring interconnecting each bolt and the second leg member for resiliently holding the block member and second roller in a substantially parallel juxtaposed position near the second leg member and the first roller, overcenter locking means interconnecting the second leg member and block member for selectively locking the block and second roller into resilient engagement with the second leg member and first roller with a collapsible conduit disposed between the first and second rollers, and a handle connected to the yoke.

DESCRIPTION OF THE DRAWINGS

The invention will be more clearly understood from the following detailed description of representative embodiments thereof read in conjunction with the accompanying drawings wherein.

DETAILED DESCRIPTION

Figure 2:
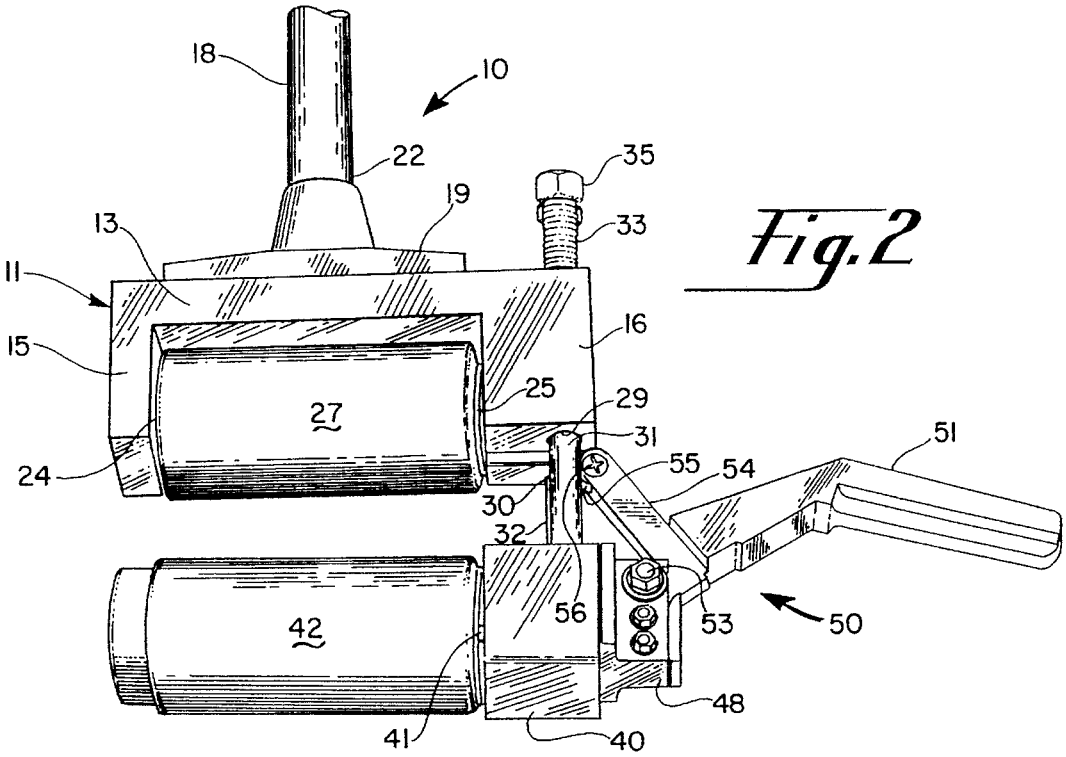
FIG. 2 shows the FIG. 1 device in the open position.
Figure 1:
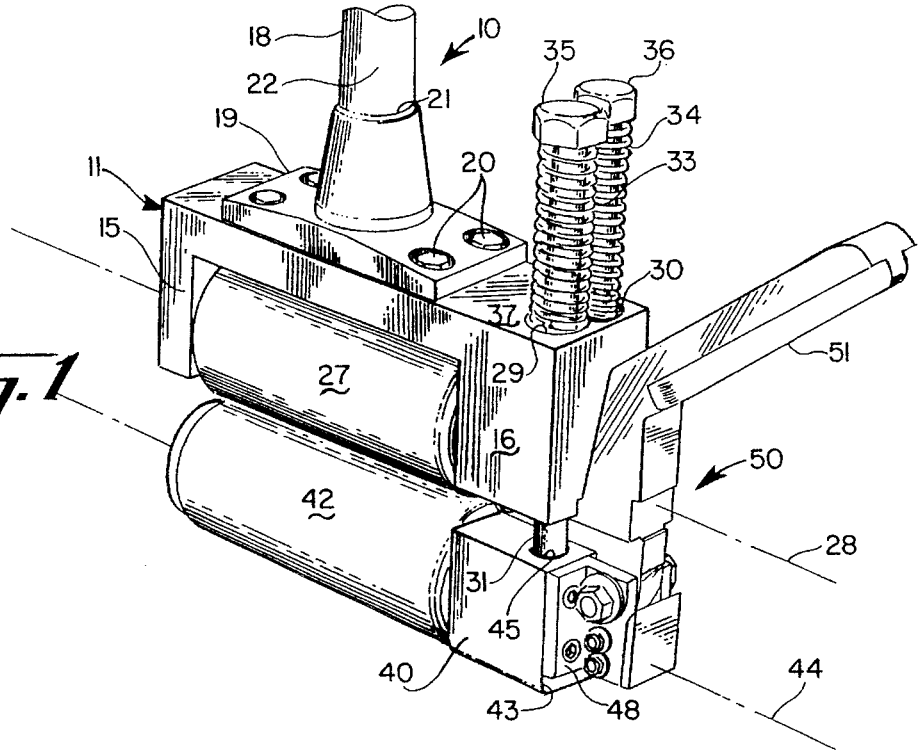
FIG. 1 is a perspective view of a representative device of the invention in the closed position.
Figure 3:
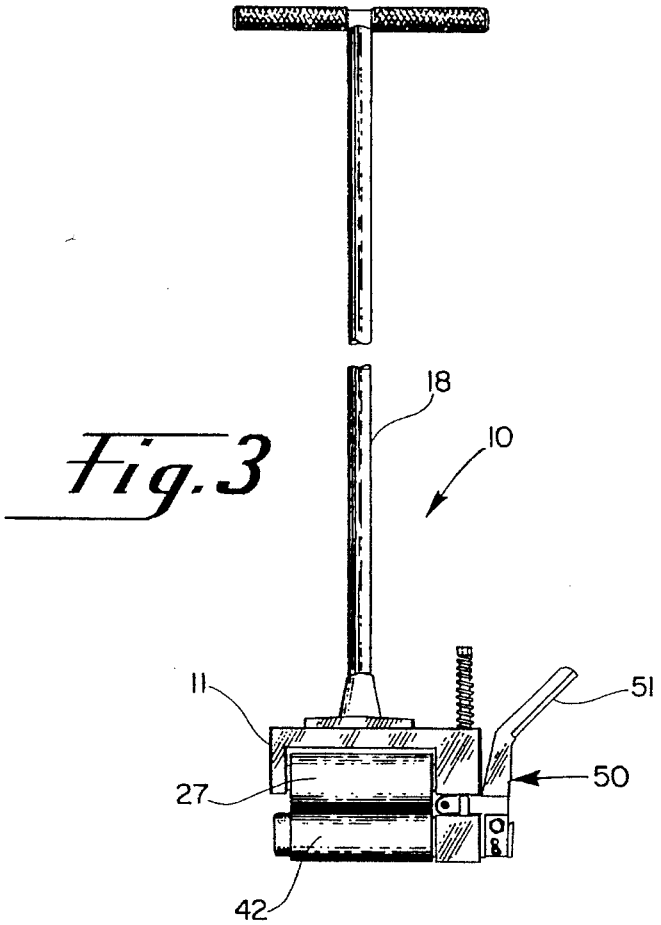
FIG. 3 shows the FIG. 1,2 device with handle attached.

Referring now to the drawings, FIG. 1 is a perspective view of a representative device 10 of the invention in a closed position, FIG. 2 shows device 10 in the open position and FIG. 3 is an overall view of device 10. In a preferred arrangement as shown in the drawings, device 10 may comprise yoke 11 including web 13 and a pair of projecting leg members 15,16. Web 13 includes means for attachment of elongated handle 18, which may include a tapped hole for receiving a threaded end of handle 18, or flange 19 attached to web 13 by screws 20 and including tapped hole 21 receiving threaded end 22 of handle 18, or other arrangement apparent to one skilled in the art guided by these teachings.

Each leg 15,16 includes on the inwardly facing surfaces thereof bearings 24,25 journaled thereinto for rotatably supporting corresponding ends of first roller 27 along axis 28. One or more holes 29,30 drilled through leg 16 slideably receive one or more bolts 31,32; coil springs 33,34 resiliently hold bolt heads 35,36 of bolts 31,32 in spaced relationship to top surface 37 of web 13.

Block member 40 supports axle 41 rotatably supporting second roller 42 along axis 44. One end 43 of block member 40 includes one or more holes 45,46 alignable with holes 29,30 receiving bolts 31,32 holding roller 42 in substantially parallel juxtaposed relationship to roller 27, and providing means for selectively guiding roller 42 into and out of substantial engagement with roller 27 as hereinafter described. In a representative device built in demonstration of the invention, rollers 27,42 were of cadmium plated steel 2-½ inches in diameter by 4 inches long and were sized to accommodate conduit up to 3 inches in diameter, although materials and dimensions of the device are not considered limiting of the invention herein.

End 43 of block member 40 also includes flange 48 for attachment of one end of overcenter lock 50. Lock 50 includes lever arm 51 attached at one end to flange 48 as at bolt 53. Crank arm 54 includes at one end thereof a yoke supporting a brass roller 55 (about 0.61" dia×0.25' in the demonstration unit) secured by bolt 56. Crank arm 54 is configured such that roller 55 rides on the bottom surface of leg 16 as lever arm 51 is manually rotated from the open condition shown in FIG. 2 to the closed condition shown in FIG. 1. Crank arm 54 is affixed at the other end to a point along lever arm 51.

Figure 4:
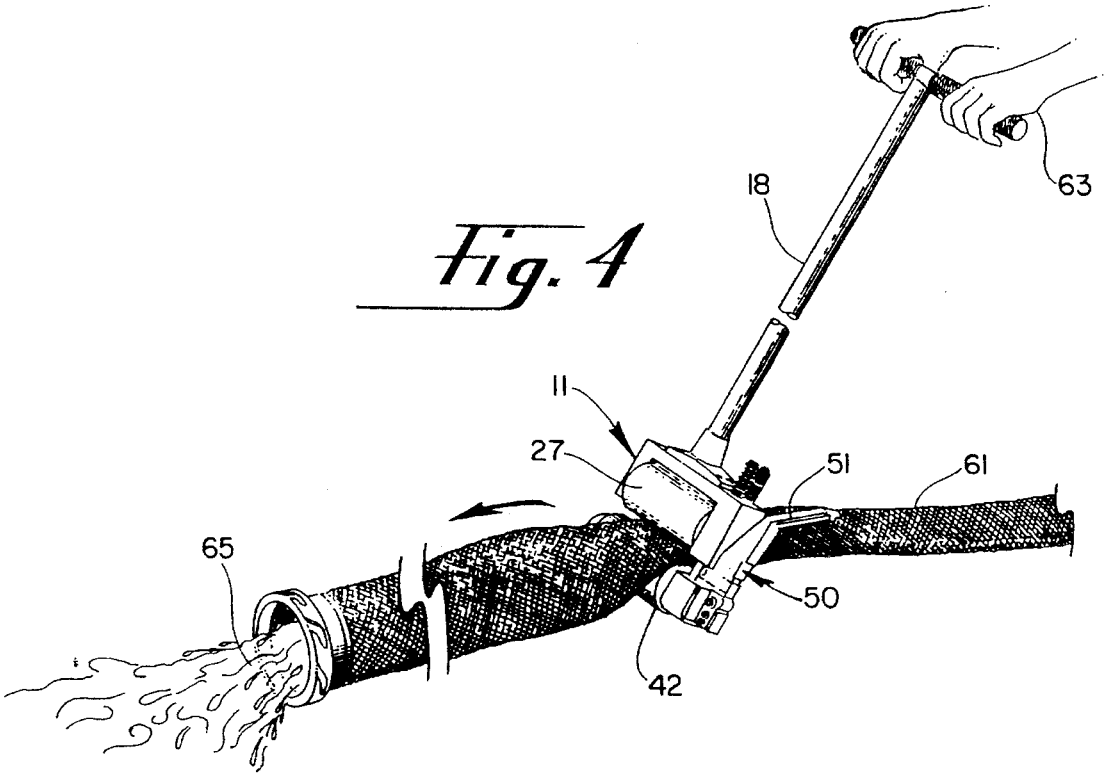
FIG. 4 shows FIG. 1 device attached to a flexible conduit in an operative position.

Referring now to FIG. 4, shown therein is a perspective view of device 10 operatively attached to flexible conduit 61, such as a collapsible fuel line, fire hose or the like, and being used by operator 63. Attachment of device 10 to conduit 61 is accomplished by opening overcenter lock 50 to the position shown in FIG. 2, inserting conduit 61 between rollers 27,42 and closing lever arm 51 to the locked position shown in FIG. 1 whereby rollers 27,42 are engaged around and against conduit 61 in the collapsed condition. In closing lever arm 51 to the FIG. 1 position with conduit 61 pressed between rollers 27,42 as shown in FIG. 4, the resiliency of springs 33,34 provide the necessary tension between rollers 27,42 to collapse conduit 61 and to force fluid 65 along conduit 61 in the direction device 10 is pushed or pulled as suggested in FIG. 4. Lever arm 51 may be operated by foot or hand depending on the tension in springs 33,34 to be overcome in closing overcenter lock 50.

The invention therefore provides a device for forcing fluid along a collapsible conduit. It is understood that modifications to the invention may be made as might occur to one skilled in the field of the invention within the scope of the appended claims. All embodiments contemplated hereunder which achieve the objects of the invention have therefore not been shown in complete detail. Other embodiments may be developed without departing from the spirit of the invention or from the scope of the appended claims.

I claim:

1. A manually operated device for forcing fluid along a flexible collapsible conduit, comprising:

(a) a yoke including a web and first and second leg members projecting therefrom;

(b) a first roller disposed between said first and second leg members and journaled at respective ends thereof into said first and second leg members for rotation about a first axis defined along said first roller;

(c) a block member supporting an axle and a second roller for rotation about a second axis substantially parallel to said first axis;

(d) said second leg member and said block member each having at least one hole therethrough for receiving a corresponding at least one bolt connecting said block to said second leg member, and spring means interconnecting each bolt and second leg member for resiliently holding said block member and said second roller in a substantially parallel juxtaposed position near said second leg member and said first roller;

(e) overcenter locking means interconnecting said second leg member and said block for selectively locking said second roller into resilient rolling engagement with said first roller with a flexible collapsible conduit disposed between said first and second rollers; and (f) a handle connected to said yoke for manually pulling said yoke and rollers in said resilient rolling engagement along said flexible collapsible conduit to force fluid through said conduit.

2. The device of claim 1 wherein said overcenter locking means includes a lever arm pivotally connected at one end to said block and a crank arm connected at one end to said lever arm and supporting a third roller at the second end, said third roller disposed for rolling contact with said second leg member.

* * * * *